United States Patent [19]

Ahmed et al.

[11] Patent Number: 5,009,913

[45] Date of Patent: * Apr. 23, 1991

[54] CHEESE-LIKE SPREAD COMPOSITION AND METHOD OF MAKING

[75] Inventors: Salah H. Ahmed, Elk Grove Village; Anthony J. Luksas, Downers Grove, both of Ill.

[73] Assignee: Dairy Research, Inc., Rosemont, Ill.

[*] Notice: The portion of the term of this patent subsequent to Sep. 6, 2005 has been disclaimed.

[21] Appl. No.: 400,391

[22] Filed: Aug. 30, 1989

[51] Int. Cl.$^5$ .................. A23C 19/09; A23C 15/06
[52] U.S. Cl. .................. 426/581; 426/582; 426/583; 426/607
[58] Field of Search ............ 426/581, 583, 607, 582

[56] References Cited

U.S. PATENT DOCUMENTS 4,769,255  9/1988  Ahmed et al. .............. 426/581

FOREIGN PATENT DOCUMENTS

83/01728  5/1983  World Int. Prop. O. .......... 426/581

Primary Examiner—Donald E. Czaja
Assistant Examiner—Helen Pratt
Attorney, Agent, or Firm—Griffin Branigan & Butler

[57] ABSTRACT

A cheese-like spread is prepared by homogenizing a mixture of a cheese composition and an emulsion inversion of a dairy product.

17 Claims, No Drawings

CHEESE-LIKE SPREAD COMPOSITION AND METHOD OF MAKING

This application relates to the subject matter of applicant' prior U.S. Pat. No. 4,769,255, issued on Sept. 6, 1988, and entitled Spreadable Butter-Like Composition and Method of Production Thereof.

BACKGROUND OF THE INVENTION

In the above-noted prior patent, the entire disclosure of which is incorporated herein by reference and relied upon, a composition is disclosed which has a taste, texture and mouth feel similar to butter but which is spreadable at refrigeration temperatures, e.g. 34° to 45° F., and will not oil-out at room temperatures and above, e.g. 85° F. or even 95° F. The composition comprises a concentrated mixture of at least one water-in-oil emulsion and at least one oil-in-water emulsion of dairy products, where the ratio of water-in-oil emulsion to oil-in-water emulsion is at least 6:4 but is less than about 9:1 and wherein the fat content of the butter-like composition is at least about 40%.

The composition is made by preparing a feed of at least one liquid dairy product which is primarily an oil-in-water emulsion and has a fat content of at least about 8%. The feed is concentrated by removing, primarily, water, lactose and ash until a concentrate having at least about 40% fat is obtained. That concentrate is homogenized and the concentrate is caused to have a phase reversal, either prior to, during or after homogenization, so that the emulsion of the concentrate is converted from a primarily oil-in-water emulsion to a predominantly water-in-oil emulsion, whereby the concentrate forms the butter-like composition, and wherein the ratio of water-in-oil emulsion to oil-in-water emulsion in the composition is at least about 6:4 but is less than about 9:1.

The invention of the above-identified prior patent is based on three primary discoveries and several subsidiary discoveries. A first basic discovery in this regard is that all of taste, texture and mouth feel must result from a composition which is predominantly a water-in-oil emulsion.

A second basic discovery of that invention is that the taste, texture and mouth feel of butter results, in part, from butter actually being a combination of a water-in-oil emulsion and an oil-in-water emulsion. While the ability to accurately pinpoint the ratios of the water-in-oil emulsion to oil-in-water emulsion in butter has not been developed, it appears that the ratio in butter is somewhere about 9:1 or above. Unfortunately, however, when that ratio of water-in-oil emulsion to oil-in-water emulsion is about 9:1, or above, the fat phase will crystalize at refrigeration temperature, and thus will render the composition essentially non-spreadable.

Therefore, as a subsidiary discovery in that invention, it was found that compositions which contain both a water-in-oil emulsion and an oil-in-water emulsion, must have a ratio thereof at or below about 9:1, or otherwise the non-spreadability of butter will also appear in that composition.

On the other hand, as a further subsidiary discovery of that invention, it was found that if that ratio is not at least about 6:4, and preferably about at least 7:3, then the taste, texture and mouth feel does not approximate that of butter. For example, it was found that the composition of U.S. Pat. No. 4,511,591, is actually a mixture of water-in-oil emulsion and oil-in-water emulsion, although the oil-in-water emulsion considerably predominates in that composition. Indeed, it appears that the ratio of water-in-oil emulsion to oil-in-water emulsion in the product of that composition is about 1:5 which, as it turns out, is about the same ratio as cream cheese, thus explaining why that composition has a taste, texture and mouth feel more similar to cream cheese than to butter.

As a further basic discovery, it was found that in order to achieve the taste, texture and mouth feel of butter, the composition must have a fat content of at least about 40% (the remainder being primarily water, milk serum and protein). Otherwise, the composition will have a predominantly watery taste, texture and mouth feel, as opposed to a predominantly fat taste, texture and mouth feel of butter.

As another subsidiary discovery in this regard, it was also found that the composition must be prepared so that essentially all of the fat which ultimately resides in the composition is in the emulsions from which the composition is formed and that fat cannot be added after those emulsions are formed, which is opposite the process in above-mentioned U.S. Pat. No. 4,511,591.

Finally, as a subsidiary discovery in that invention, it was found that in order to achieve these high fat levels, the dairy product from which the composition is made must be considerably concentrated prior to forming the composition; otherwise its high fat levels cannot be obtained, and the resulting composition will not have the taste, texture and mouth feel of butter.

In the process described in the above-noted prior patent, one or more feeds are used to produce a mixture which has a fat content of at least about 8%. The feeds can be any dairy products, so long as those dairy products are in liquid form and so long as those dairy products are primarily oil-in-water emulsions. However, most dairy products, indeed, meet these requirements and, therefore, any of the conventional dairy products may be used, for example, skim milk, low-fat milk, whole milk, non-fat milk solids, and cream and concentrated forms thereof, e.g. evaporated skim milk, whole milk, and cream. Other dairy products, such as buttermilk, could be used, and the particular form of the dairy product is not critical, other than the two reservations noted above. If, for example, skim milk is used as a feed, then a second feed must be used, since skim milk will not provide the necessary fat content of at least about 8%. Accordingly, in this situation, there would be at least two feeds, e.g. one of skim milk and one of cream so that the fat content of the mixture reaches at least about 8%. On the other hand, the amount of fat in the mixture cannot be overly high, since it will interfere with the concentration step. Thus, preferably, the fat content is not above about 30%, although higher fat contents than this may be used, e.g. up to about 35% fat or even a bit higher, if care is taken in the concentration step. Nevertheless, for practical and usual purposes, the fat content of the mixture will not be greater than about 30%.

After the mixture is formed, that mixture must be concentrated so that the concentrate has a fat content of at least about 40%, but more preferably about 50%. The concentrate may have a fat content up to about 60%, or even greater, but at fat contents significantly above 60%, the concentration step becomes more difficult.

The preferred concentration step utilizes ultrafiltration. Any conventional ultrafiltration unit may be used in this regard, and it is only necessary that the ultrafiltration unit retain substantially all of the protein in the concentrate (the protein, in part, functions as the natural emulsifiers), with the permeate containing, primarily, water, lactose and ash. This is achieved by the usual dairy ultrafiltration unit, and, thus, any conventional dairy ultrafiltration unit may be used in the concentrating step. Likewise, conventional temperatures for operating the ultrafiltration unit are quite acceptable, e.g. 100° to 130° F., although temperatures outside of this range may be used, if desired, e.g. 40° to 150° F.

After the concentration step, the resulting concentrate is homogenized. Any of the conventional dairy homogenizers may be used in this regard, and those homogenizers may be operated at conventional temperatures, e.g. 120° to 160° F., although temperatures outside of this range may be used if desired, e.g. 110° to 180° F. However, either prior to, during or after homogenization, the concentrate must experience a phase reversal, i.e. reversing the emulsion from, primarily, an oil-in-water emulsion to, predominantly, a water-in-oil emulsion. This phase reversal can be achieved by any relatively high shear mixing operation. However, since homogenization is a high shear mixing operation, it is more convenient and efficient to achieve at least a portion of the phase reversal during the homogenization step and in the homogenizer. Thus, it is only necessary to operate the conventional dairy homogenizer for a time and at a shear rate which will not only homogenize the product but achieve a portion of the phase reversal at the same time. With the phase reversal, the concentrate forms a butter-like composition which is, essentially, the product of the invention of the prior patent.

With butterfat concentrations of about at least 40%, the phase reversal is relatively easy to achieve in the usual dairy processing apparatus. As the feed is being further and further concentrated during ultrafiltration (the preferred concentration device), and the butterfat content is increased, some phase reversal will commence during ultrafiltration. When the butterfat content, during continued ultrafiltration, significantly exceeds 40%, substantial amounts of phase reversal will take place during ultrafiltration. Thus, it is possible to achieve the phase reversal, especially in regard to the lower emulsion ratios, entirely during ultrafiltration.

However, additional shear is often required to achieve the desired degree of phase reversal, especially in regard to the higher emulsion ratios, and this additional shear is provided by the homogenization step, where further phase reversal takes place. In addition, even if all of the desired phase reversal takes place during ultrafiltration, the composition should nevertheless be homogenized, or otherwise the product will not be of the quality and uniformity normally desired.

Accordingly, while the ultrafiltration step is referred to as a concentration step, in fact, significant or even substantially all of the required phase reversal may take place in that step. Likewise, while the homogenization step is characterized and a means of achieving phase reversal, little or most or even all of the phase reversal may take place during homogenization. Thus, it is the combination of ultrafiltration and homogenization which achieves the required phase reversal and the completion of the product.

To complete the composition, only conventional ingredients need be added. These conventional ingredients can include flavorings, such as salt, colorings, e.g. FDA yellows, and the like.

The composition is then packaged in any convenient package by any conventional packaging apparatus. While pasteurization may be performed during packaging, if a pasteurizing step is desired, it is preferred that the pasteurizing step take place prior to homogenization. Thus, the pasteurizing step, if desired, may take place at any point in the process, preferably prior to homogenization, and more preferably in the feed step, although pasteurization anytime prior to packaging may be used.

The composition can be molded, for example, into one pound blocks, quarter pound sticks, or packaged in tubs in the conventional manner.

The characteristics of the composition will somewhat depend on the ratio of the water-in-oil emulsion to the oil-in-water emulsion. With lower ratios, the spreadability will increase but the taste, texture and mouth feel will not be as close to that of butter as would be higher ratios. On the other hand, as the ratio is increased, the taste, texture and mouth feel will be more similar to butter, but the spreadability thereof will decrease. The optimum combination of these properties is where the ratio is about 7:3 to 8:2, and this will produce a taste, texture and mouth feel very similar to butter, while providing good spreadability.

While the composition of the prior patent provides considerable improvement in the art in regard to conventional spreads, as discussed above, that spread is directed to butter-like compositions and, substantially, is to be used only for accompaniments to foods in the manner of butter or margarine. However, since that composition provides considerable nutritional value, and since it is relatively inexpensive to manufacture, it would be most desirable to provide other compositions which can take advantage of the nutritional value and low cost of manufacture but which are useful in food accompaniments other than that similar to butter or margarine.

BRIEF DESCRIPTION OF THE INVENTION

The present invention is based on the discovery that the composition of the prior patent can be modified by the incorporation therein of cheese flavors to produce a cheese spread. It has also been found that the cheese flavors may be provided by either natural cheese, cheese food (mixtures of cheese and other dairy ingredients), or imitation cheese. Most surprisingly, it has been found that the incorporation of the cheese flavors into the composition of the prior patent does not materially degradate the spreading properties of the composition of the prior patent and forms a composition which can be from very easy to spread properties to rather hard and somewhat difficult to spread properties, depending upon the amount of cheese flavor added therein. However, it has also been found that the composition provides a taste, texture and mouth feel of a cheese food composition but which has a mild, clean taste and less lingering background flavors than cheese.

Thus, briefly stated, there is provided a cheese-like spread composition which has the taste, texture and mouth feel of a cheese food composition. The composition comprises a homogenized concentrated mixture of at least one water-in-oil emulsion of a liquid dairy product, at least one oil-in-water emulsion of a liquid dairy product, and at least one cheese-flavored composition. The ratio of the water-in-oil emulsion to the oil-in-water emulsion is at least 6:4 but less than 9:1, the ratio of the emulsions to the cheese-flavored composition is between 9:1 and 1:4, and the total fat content of the composition is at least 40%.

To produce this composition, it has been discovered that the process of the prior patent must be somewhat modified in order to make an imminent homogenized mixture of the emulsions and the cheese-flavored composition. In this regard, a feed is prepared of at least one liquid dairy product which is primarily an oil-in-water emulsion and has a fat content of at least 8%. That feed is concentrated by removing water, lactose and ash until a concentrate having at least 40% fat is obtained. The concentrate is then mixed with the cheese composition in the ratios noted above, i.e. between 9:and 1:4. That mixture is slowly heated to a temperature sufficient to melt the fat in the mixture and to suppress any enzymes or microbiologics in the mixture. The mixture is then cooled and then homogenized. Either prior to, during or after homogenization, a phase reversal of the concentrate of the mixture is performed so that the feed emulsion is converted from a primarily oil-in-water emulsion to a predominantly water-in-oil emulsion. This produces a mixture which is in the form of a cheese-like spread, and the ratio of water-in-oil emulsion to oil-in-water emulsion in the mixture is at least 6:4 but is less than 9:1.

DETAILED DESCRIPTION OF THE INVENTION

The cheese composition of the product, and as used in the process, can be either a natural cheese, a cheese food or an imitation cheese. Natural cheeses, such as cheddar cheese, blue cheese, Roquefort cheese, brie cheese and cream cheese, may be used, among others, and the particular cheese is not critical to the invention, but only provides the cheese flavor of the resulting cheese spread. However, instead of natural cheese, a cheese food may be used to flavor the composition. As is well known in the art, cheese foods are mixtures of natural cheeses and other dairy products to modify the properties of the cheese food composition. Since cheese foods are well known to the art (standards of identity have been established), it is not necessary to describe those cheese foods in detail, but as is also known in the art, these cheese foods can have a variety of flavors, including the flavors of natural cheeses and including additional flavors, such as flavors derived from bacon bits, jalapeno peppers, and the like. However, it is also possible to use imitation cheese compositions, many of which are commercially available. Generally speaking, these imitation cheese compositions are based on either naturally flavored or imitation flavored gels of caseinates, e.g. sodium caseinate and calcium caseinate. However, it is preferred that the cheese composition is a natural cheese, since this provides the best flavor, as well as the best mouth feel and texture.

As noted above, the ratio of the water-in-oil emulsion and oil-in-water emulsion of the prior patent, which forms the spreadable butter-like composition, to the cheese composition can vary between 9:1 and 1:4, and while this is a very broad range, the composition still remains stable. However, the spreading properties of the resulting composition within that range will vary considerably. Thus, when the ratio of the emulsions to the cheese composition is about 9:1, the spreading properties will be essentially the same as the spreading properties of the prior patent. However, since this amounts to only about 10% cheese composition in the mixture, the cheese flavor of the resulting spread is considerably reduced. On the other hand, when the ratio of the emulsions of the prior patent to the cheese composition is about 1:4, very intense cheese flavors will be produced, but the spreading properties will be considerably reduced, and the spreading properties of the composition will be more like that of the cheese composition used in the mixture. For balancing of flavor intensity and spreading properties, the ratio of the emulsions of the prior patent to the cheese composition in the mixture is more preferably about 5:1 to 1:2, and more preferably about 2:1 to 1:1.

As briefly noted above, in order to make a stable homogeneous mixture of the butter-like spread of the prior patent and the cheese composition, a modification of the process of the prior patent must be made. Thus, the process of the prior patent is conducted in the same manner as described in the prior patent through the steps of preparing the feed of liquid dairy product to the process and concentrating that feed to a fat content of at least 40% by removing water, lactose and ash therefrom. At this point in the process of the prior patent, the cheese composition is mixed with the concentrate of the process of the prior patent, in the ratios described above. However, in order to make a stable and homogeneous mixture of the concentrate and the cheese composition, the mixture must be heated to a temperature sufficient to melt the fat in the mixture, i.e. both the fat in the concentrate and the fat in the cheese composition. This results in the ability, later in the process, to have an intimate mixture of the fats of the two systems, which fats will provide the spreading and flavor properties of the resulting composition. If natural cheese is used, then the melting point of the butterfat in both the concentrate and the cheese composition will be about 95° F. or slightly above, and that temperature could be used for that melting purpose. However, especially with natural cheeses, the melting point of the fat can vary somewhat, and for that reason, it is preferred to heat the mixture to at least about 110° F. and up to about 130° F. in order to insure that complete melting has taken place.

On the other hand, when natural cheese is used, or even some cheese food compositions and imitation cheese foods, there remains in those compositions some enzymatic and biological activity. It is, therefore, preferable to suppress that enzymatic and biological activity during the heating step, by heating the mixture to a temperature sufficient to suppress any enzymes and biologics in the mixture. To this end, it is preferable to heat the mixture to at least 130° C. and more preferably to at least 140° C., which will largely destroy any enzymes. However, where biologics may also be contained in the mixture, it is more preferable to heat the mixture to between 160° F. and 180° F. for about 1 to 10 minutes. This will ensure pasteurization of the mixture, although lesser conditions may well be used, i.e. 160° F. to 170° F. for between 3 and 5 minutes.

When heating the mixture, the heating should be conducted in a slow manner. As is known in the art, particles of cheese can "case harden" when heated too rapidly, and this will cause difficulty in achieving a homogeneous mixture of the cheese composition and the spreadable composition of the prior patent. The rate of increase of temperature will depend upon the particular cheese composition being used in the mixture, but these temperatures are well known to the art and can be chosen for any particular cheese. However, generally speaking, a temperature rise of approximately 5 to 15 degrees in 10 to 30 minutes is generally acceptable.

After the mixture is heated, it is cooled to at least below a temperature where "case hardening" of the cheese is no longer a problem. This, as noted above, will vary will the particular cheese but, generally speaking, should be at least below 140° F. (if heated to above that temperature during the heating step) and more preferably to a temperature below 110° F., although cooling to about room temperature or slightly above is preferred.

After cooling, the process of the present invention follows the process of the prior patent, as noted above, in that the mixture is then homogenized and a phase reversal of the concentrate in the mixture is performed, according to the disclosure of the prior patent. After this phase reversal takes place, the mixture forms a cheese-like spread, with the taste of that spread being, largely, determined by the cheese composition incorporated therein.

The only exception to the foregoing is that in the prior patent, it is disclosed that either single-stage or two-stage conventional dairy homogenizers may be used with total homogenization pressures of between about 800 and 2500 psi, although for various compositions those pressures can vary considerably. In the present process, while a two-stage homogenizer can be used, it is preferred to use a single-stage homogenizer. If a two-stage homogenizer is used, then it is preferred that the second stage be operated at the minimum pressures of that particular homogenizer. In the present process, as is in the process of the prior patent, the pressures of the homogenizer will affect the spreading properties of the composition. In the present process, the homogenization pressure can be considerably lower than that of the prior patent, i.e. down to 200 psi, although the upper range, i.e. 2500 psi, can be used with the present process. However, it is preferred that the homogenization pressures of the present process be between about 400 and 1500 psi, in order to keep the spreading properties in a more desirable range, and even more preferably at pressures between 500 and 1200 psi.

Also, to keep the spreading properties in a more desirable range, similar to that of cheese food, it is preferred that the ratio of the concentration to the cheese composition be between about 5:1 and 1:1 and that the cheese composition is a softer cheese composition, as opposed to the harder cheese compositions. For example, the softer cheeses of cheddar cheese, Roquefort cheese, blue cheese, brie cheese and cream cheese provide better spreading properties, as opposed to the harder cheeses such as parmesan cheese, Italian cheese and the like.

After the process, the cheese spread may be packaged in any desired means, such as tubs, glass containers, and the like. The composition then is quite useful for making hors d'oeuvres, cheese sauces, cheese toppings, or simply spreading on crackers and the like for immediate consumption. The taste is quite like the cheese composition used in preparing the present composition, with the intensity of that cheese flavor being essentially dependent upon the amount of cheese composition used therein, as explained above. Especially with higher amounts of cheese composition used in the present composition, the melting properties of the present composition will be more like that of the cheese composition used therein. Thus, for example, when the cheese composition is natural cheddar cheese, and the ratio of the concentrate to the cheese composition used in producing the present composition is about 1:1, then the present composition will have melting properties very similar to natural cheddar cheese, but will have spreading properties much greater than natural cheddar cheese, i.e. the present composition can be spread with an ordinary table knife. This allows the present composition to be easily used in manners similar to uses of natural cheddar cheese, for example, in making cheeseburgers, macaroni and cheese and the like.

The composition can also be used for making cheese-flavored fillings, e.g. a cheese-flavored filling for hot dogs, snack crackers and rings, tortellini, tortaloni and the like. The composition can also be used to prepare other cheese-flavored fillings such as pie and cake fillings. For example, the composition can be formulated with conventional ingredients for making a cheesecake filling, e.g. sugar, spices, lemon juice, thickeners, etc., and such a filling can be placed in a conventional crumb pastry or a cake cone or the like to make a multi-serving or a single serving cheesecake.

What is claimed is:

1. A cheese-like spread composition which has the taste, texture and mouth feel of a cheese food composition, comprising a homogenized concentrated mixture of (a) at least one water-in-oil emulsion of a liquid dairy product, (b) at least one oil-in-water emulsion of a liquid dairy product, and (c) at least one cheese composition, wherein the ratio of (a) to (b) is at least 6:4 but is less than 9:1, the ratio of (a) and (b) to (c) is between 9:1 and 1:4, and the total fat content of the composition is at least 40% and wherein the starting liquid dairy product is primarily an oil-in-water emulsion in the natural state.

2. The composition of claim 1 wherein the ratio of (a) and (b) to (c) is between 5:1 and 1:2.

3. The composition of claim 1 wherein the cheese composition is a natural cheese, a cheese food or an imitation cheese composition.

4. The composition of claim 3 wherein the cheese composition is a natural cheese.

5. The composition of claim 4 wherein the natural cheese is cheddar cheese, blue cheese, Roquefort cheese or brie cheese.

6. A method for producing the composition of claim 1 comprising:
   (a) preparing a feed of at least one liquid dairy product which is primarily an oil-in-water emulsion and has a fat content of at least about 8%;
   (b) concentrating the said feed by removing water, lactose and ash until a concentrate having at least about 40% fat is obtained;
   (c) mixing the concentrate with a cheese composition in a ratio of the concentrate to cheese composition of between 9:1 and 1:4;
   (d) slowly heating the mixture to a temperature sufficient to melt the fat in the mixture and to suppress any enzymes and microbiologics in the mixture;
   (e) cooling the mixture;
   (f) homogenizing the mixture; and
   (g) causing a phase reversal of the concentrate in the mixture, either prior to, during or after homogenization of the mixture so that the feed emulsion is converted from a primarily oil-in-water emulsion to a predominantly water-in-oil emulsion, whereby the mixture forms a cheese-like spread, and wherein the ratio of water-in-oil emulsion to oil-in-water emulsion in the mixture is at least about 6:4 but is less than 7:1.

7. The process of claim 6 wherein the mixture is heated to at least 130° F.

8. The process of claim 7 wherein the mixture is heated to at least 140° F.

9. The process of claim 8 wherein the mixture is heated to between 160° F. and 180° F. for about 1 to 10 minutes.

10. The process of claim 9 wherein the mixture is heated to between 160° F. and 170° F. for between 3 and 5 minutes.

11. The process of claim 6 wherein the homogenization pressure is between 200 and 2500 psi.

12. The process of claim 6 wherein the homogenization pressure is between 400 and 1500 psi.

13. The process of claim 11 wherein a single-stage homogenizer is used.

14. The process of claim 11 wherein a two-stage homogenizer is used, and the second stage is operated at minimum pressures.

15. The process of claim 6 wherein the homogenization pressure is between 500 and 1200 psi.

16. The process of claim 6 wherein the ratio of the concentrate to the cheese composition is between 5:1 and 1:1.

17. The process of claim 6 wherein the cheese composition is a natural cheese.

* * * * *